(12) United States Patent
Flenley et al.

(10) Patent No.: US 7,493,286 B1
(45) Date of Patent: Feb. 17, 2009

(54) FILTER MODULE FOR A TRANSACTION PROCESSING SYSTEM

(75) Inventors: John Martin Flenley, Waterlooville (GB); Georges Joseph Gregory Riche, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/209,124

(22) Filed: Dec. 10, 1998

(30) Foreign Application Priority Data

May 9, 1998 (GB) ................................. 9809827.0

(51) Int. Cl.
*G06F 17/60* (2006.01)
(52) U.S. Cl. .............................. 705/43; 705/35; 705/42; 902/40
(58) Field of Classification Search .................. 705/43, 705/35, 42; 902/8, 13, 40, 10; 235/379
See application file for complete search history.

(56) References Cited

U.S. PATENT DOCUMENTS

| | | | | |
|---|---|---|---|---|
| 4,660,168 A | * | 4/1987 | Grant et al. | 705/43 |
| 5,457,305 A | * | 10/1995 | Akel et al. | 705/43 |
| 5,506,955 A | | 4/1996 | Chen et al. | 395/183 |
| 5,644,728 A | * | 7/1997 | Pillans | 705/43 |
| 5,682,482 A | * | 10/1997 | Burt et al. | 705/42 |
| 5,740,355 A | * | 4/1998 | Watanabe et al. | 714/45 |
| 5,780,825 A | * | 7/1998 | Sato et al. | 902/8 |
| 5,842,211 A | * | 11/1998 | Horadan et al. | 705/43 |
| 5,917,421 A | * | 6/1999 | Saunders | 705/64 |
| 5,940,813 A | * | 8/1999 | Hutchings | 705/43 |
| 5,956,489 A | * | 9/1999 | San Andres et al. | 709/221 |
| 6,003,019 A | * | 12/1999 | Eaton et al. | 705/42 |
| 6,039,245 A | * | 3/2000 | Symonds et al. | 235/379 |
| 6,073,119 A | * | 6/2000 | Bornemisza-Wahr et al. | 705/42 |
| 6,085,177 A | * | 7/2000 | Semple et al. | 705/43 |

FOREIGN PATENT DOCUMENTS

| | | |
|---|---|---|
| EP | 0 520 766 | 12/1992 |
| GB | 2 319 102 | 5/1998 |

OTHER PUBLICATIONS

Williams, Fred O., "Most ATM Net Will Jump Into Online Fray", Washington Business Journal, vol. 14, Issue 48, p. 3, Apr. 12, 1996.*

* cited by examiner

*Primary Examiner*—John W. Hayes
(74) *Attorney, Agent, or Firm*—Gregory M. Doudnikoff

(57) ABSTRACT

A filter module for a WOSA/XFS transaction processing system is disclosed. The system includes a WOSA transaction manager which is responsive to transaction requests from at least one application. A service provider layer is adapted to relay transaction requests passed from the transaction manager to associated hardware for execution. The filter module is adapted to intercept transaction requests from the transaction manager to the service provider layer and to process the requests. The filter module is further adapted to intercept transaction responses form the service provider layer to the transaction manager and the at least one application and to process these responses.

11 Claims, 5 Drawing Sheets

FILTER MODULE FOR A TRANSACTION PROCESSING SYSTEM

FIELD OF THE INVENTION

The present invention relates to a filter module for a transaction processing system.

BACKGROUND OF THE INVENTION

WOSA/XFS (Windows Open Services Architecture for Extended Financial Services) is an emerging standard enabling financial institutions, whose branch and office solutions run on the Windows NT platform, to develop applications independent of vendor equipment.

FIG. 1 shows the standard WOSA model in solid lines. Using this model, an application 10 communicates hardware requests 12 to various hardware devices in an ATM 14 via a WOSA manager 20. The application issues transaction requests 12 which are hardware independent, and thus vendor independent. The requests are queued by the WOSA manager 20 which manages concurrent access to the ATM hardware 14 from any number of applications 10.

When a piece of hardware is installed on the ATM, it registers its controlling software, known as a service provider module (SPM) 30, with the WOSA manager by using, for example, the Windows registry. The WOSA manager 20 is thus able to relay a hardware request 12 to an appropriate SPM 30, using the Windows registry as a look-up table. The SPM 30 takes relayed hardware independent requests 16 from the WOSA manager and actuates the appropriate piece of hardware to process the requests. The results of a request can be returned to the application by an SPM 30 synchronously via the WOSA manager 20 or asynchronously directly to the application 10.

During development, it can be very difficult to debug a WOSA system, because at run-time a number of applications may be generating hardware requests and receiving responses either synchronously or asynchronously at any given time. Messages are transmitted via many routes at run-time and the operation of one application's requests and responses could interfere with those of another application.

It can also be desirable in an installed system to keep track of or log the operation of sensitive parts of a WOSA system. It may be desirable to track applications who are requesting access to a cash dispenser and the responses of the cash dispenser to those requests. Also, for example, keeping track of the number of bad card reads might indicate the card reader is coming to the end of its life or needs cleaning. Similarly, the number of uses of the printer can be tracked to determine when the printer ribbon needs to be replaced, as well as numerous other examples.

It is an object of the present invention to provide a filter module to solve these problems.

SUMMARY OF THE INVENTION

Accordingly, the present invention provides a filter module for a transaction processing system in which a transaction manager responsive to transaction requests from at least one applications and a service provider layer is adapted to relay transaction requests passed from said transaction manager to associated hardware for execution; said filter module being adapted to intercept transaction requests from said transaction manager to said service provider layer and to process said requests, said filter module being further adapted to intercept transaction responses from said service provider layer to said transaction manager and at least one application and to process said responses.

DESCRIPTION OF THE PREFERRED EMBODIMENTS

Figure 1:
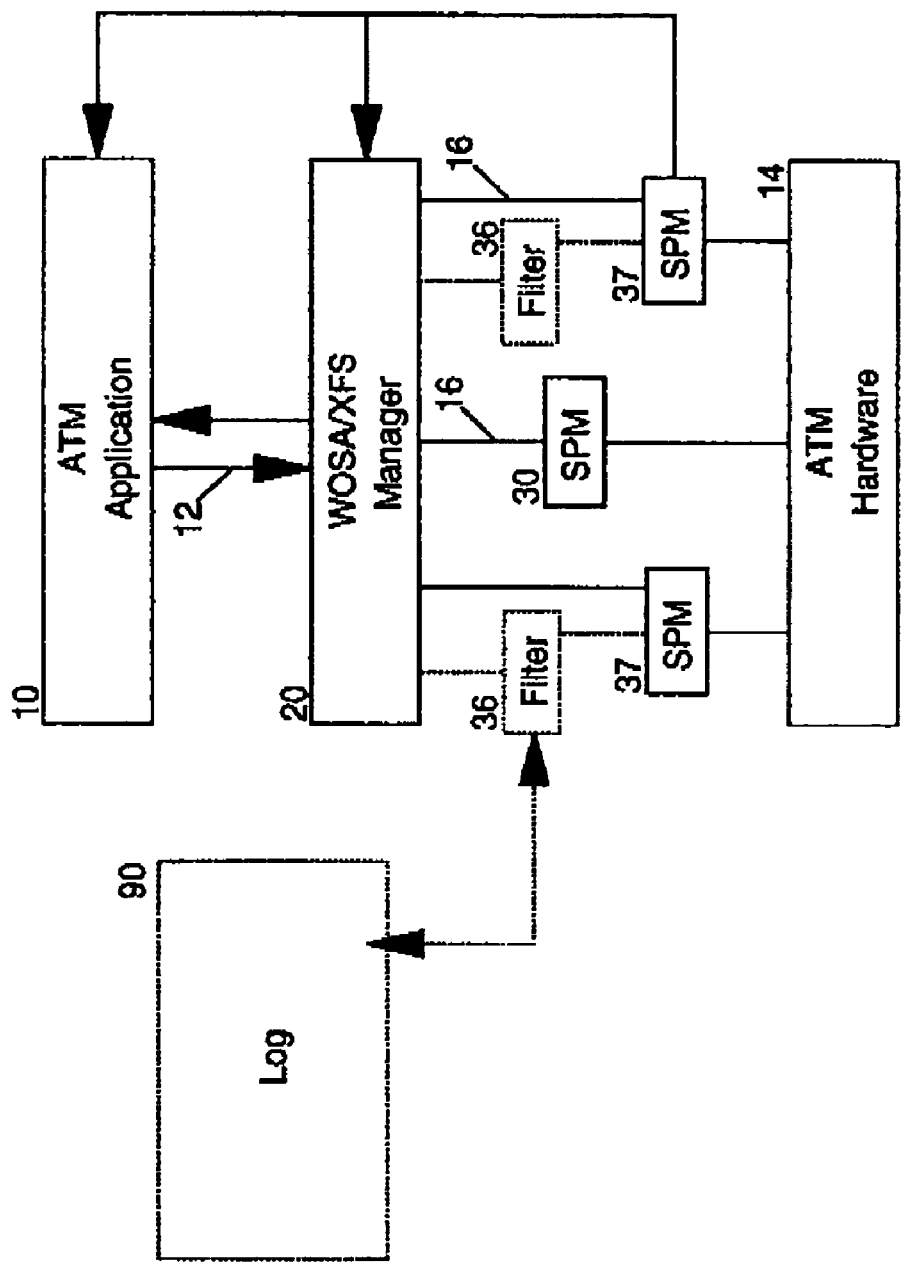
FIG. 1 shows a standard WOSA single process transaction processing system including a filter module according to the invention (shown shaded)

The standard WOSA model includes three layers, FIG. 1. An application layer 10 issues transaction requests in the form of hardware independent Application Programming Interface (API) calls 12 to a WOSA Manager 20 layer in order to access services from a Service Provider 30, 37 layer. All components exist within the same process (the Application's) and memory address space.

WOSA is a classic single process model, where all components of the solution run in the same process. If a single thread within this process abends, it will normally take the entire process down. Although this is acceptable in non-critical applications, for example printing, it is not acceptable where security is involved and where detailed audit trails are required. The best example of this case is where ATM cash dispensing is involved. If the process abends while a dispense is taking place, the error needs to be recoverable in order to determine the disposition of the cash involved.

Figure 2:
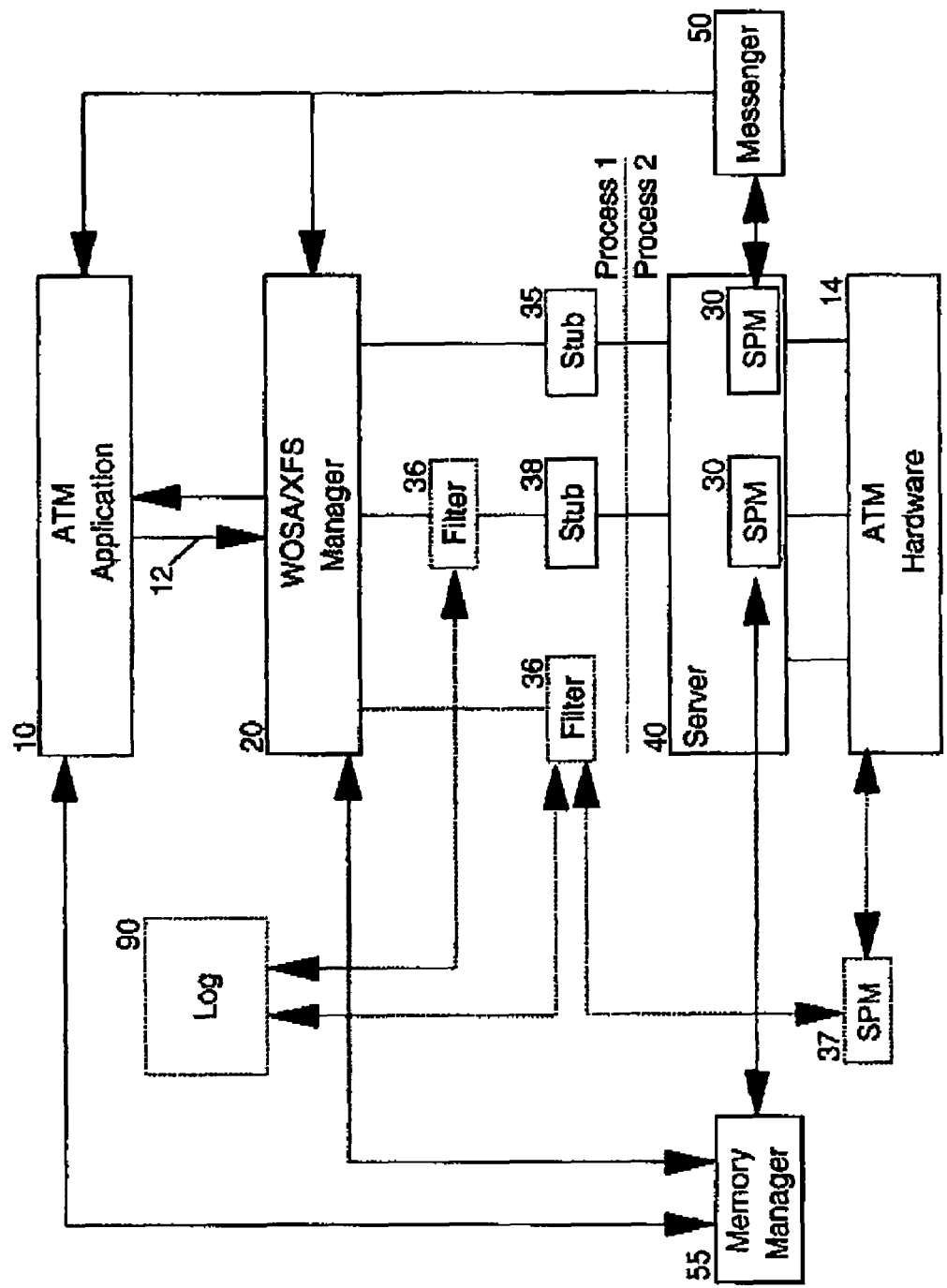
FIG. 2 shows an alternative transaction processing system including the filter module of FIG. 1 (shown shaded)

In an alternative server model, FIG. 2, the application 10 and WOSA Manager 20 exist within the same user application process. The WOSA manager 20, however, communicates with stub Dynamic Link Libraries (DLLs) 35 each corresponding to a respective SPM 30 of FIG. 1. Transaction requests 12 from the application layer 10 pass through the WOSA Manager 20 to the stub DLLs 35, where the data is repackaged and passed across process boundaries to a server 40 running in a separate process, where the required transaction request is actually executed. Once a request is received, the server 40 communicates with SPM's 30 to execute the transaction request.

In either model, any execution results are either passed back from the SPMs to the application 10 through the WOSA manager 20 (via the stub DLLs 35 in the case of FIG. 2) or directly to the application 10.

In a Windows NT operating system embodiment of the invention, the SPMs 30 generate windows events using a window handle nominated by an application, whereas in an embodiment of the invention using IBM's OS/2 operating system, the SPMs generate presentation manager events.

In either case, the application 10 passes an identifier (either a window handle or presentation manager event) corresponding to the application itself (asynchronous) or the WOSA manager (synchronous) to an SPM so that the SPM knows where to send its response.

Similarly, the stub modules 35 also communicate messages to the WOSA manager 20 via the operating system messenger, because the window handle or presentation manager event for the WOSA manager 20 will be included in the response returned from the server 40.

The method of response is therefore determined by the application 10, depending on whether a transaction request issued is specified as synchronous (the server responds through the stub DLL mechanism) or asynchronous (the server responds via the Windows Event mechanism).

Information is also accessible by both the application 10 and the SPMs using shared memory. When, for example, an SPM 30 wishes to transmit information to an application 10, the SPM sends a WOSA call to the WOSA manager 20 which communicates with an operating system memory manager 55 to allocate the shared memory. Once allocated, then SPMs 30 in the server 40 process or applications 10 can read or write information from this shared memory.

Figure 3:
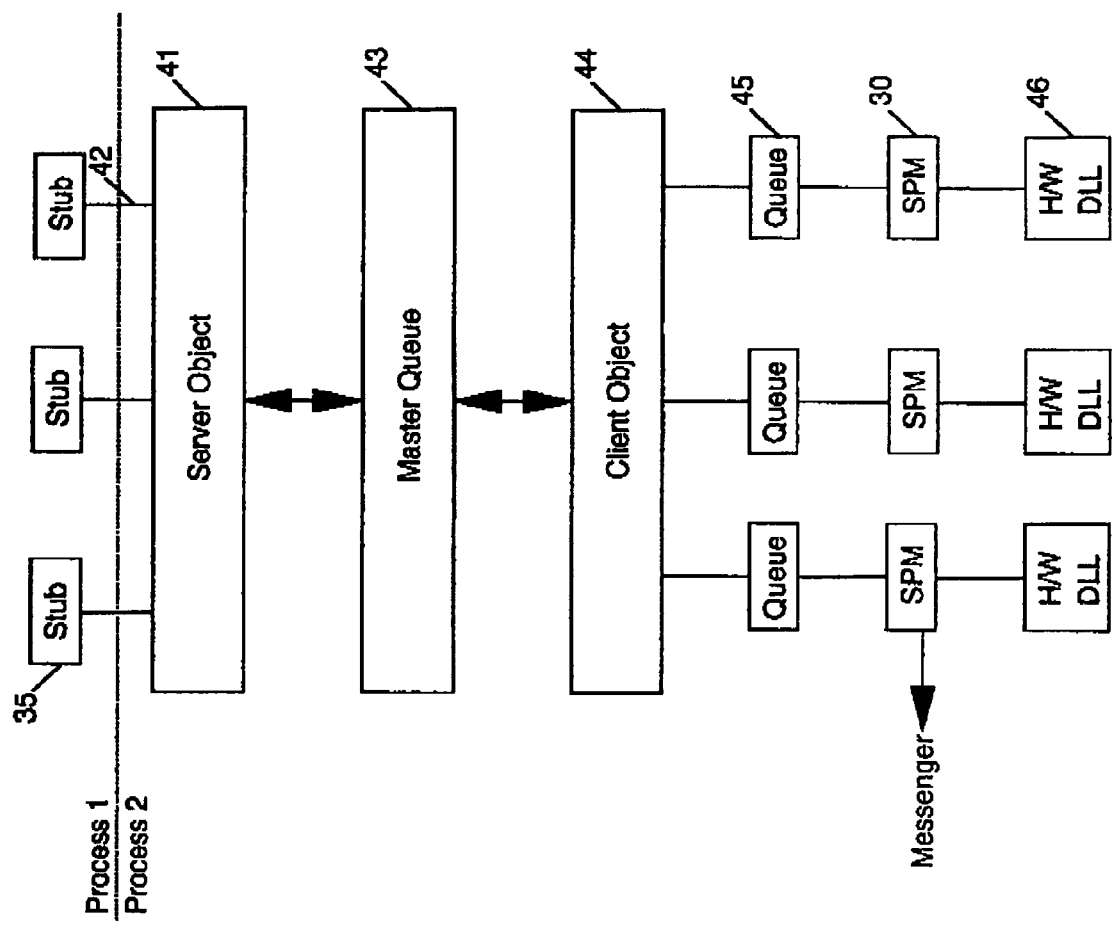
FIG. 3 shows a server component of the transaction processing system of FIG. 2 in more detail.

FIG. 3, shows the server 40 in more detail. The server is a multi-threaded application supporting the simultaneous execution of transaction requests on all of its supported WOSA device classes explained below. The server 40 consists of the following major components:

A server object 41 runs in its own thread and has responsibility for creating and monitoring memory 'pipes' 42 connecting the server process to respective stub DLLs 35, running in the user application process. When the server object detects a transaction request packet from one of the stub DLLs 35 waiting in its associated 'pipe' 42, it moves the packet into a master queue 43 and thus frees the pipe for more communications. The server also detects packets in the master queue 43 that are response packets from service provider modules 30, and channels these back through the 'pipes' to the correct stub DLL 35, which then passes the response back to the user application 10 via the WOSA Manager.

The memory pipes 42 are implemented in a class including essentially three methods: readpipe( ), writePipe( ), queryp-ipe( ) with the methods being passed an identifier corresponding to the stub DLL associated with the pipe. In the application process, a stub DLL 35 receives a WOSA transaction request from the transaction manager and calls the writePipe method to place the request in its pipe 42. writePipe essentially writes a message to a designated location in shared memory with a flag indicating that the message needs to be read. Once the stub DLL 35 has written the message to the pipe, it then polls its pipe 42 continually using queryPipe to determine when a response has been sent from the server 41 or if the message has been read.

Within the server process, the server object 41 continually polls each of the pipes 42 using the queryPipe method for each pipe in turn to determine if messages are waiting to be processed. If a pipe has a message, the server calls readpipe to read the message from the pipe, resets the message flag indicating that the message has been read and places the message in the master queue 43. The server also interrogates the master queue 43, and if a message for the server 41 is in the master queue 43, the server 41 pops the messages from the queue and calls writePipe to place the message in the appropriate pipe and thereafter reverts back to querying the pipe for the next message.

A client object 44 runs in its own thread and is responsible for creating and managing the supported service provider modules 30 below it. The client object 44 monitors the server master queue 43 and when it detects an inbound packet for one of its managed hardware devices, it moves the packet from the queue 43 on to a private queue 45 associated with a target device.

Instances of service provider module objects 30 are created at startup time by the client. In the case of an ATM, objects would be instantiated for a journal printer, receipt printer, passbook printer, statement printer, deposit unit, cash dispenser, magnetic card reader/smart card reader, sensors and indicators unit, pinpad unit, encryptor unit, vendor dependant mode (VDM) unit, and text terminal unit. Each instantiation spawns its own control thread that is responsible for monitoring its own private queue 45 for requests that are placed there by the client object 44. When an SPM object 30 detects a request waiting on its private queue 45, or if there is a request pending execution and it is time to attempt to process pending requests again, the SPM object spawns an execution thread that handles the execution of that single request. The execution thread has the responsibility of processing the request to its conclusion, either returning the relevant data to the caller application 10 via events, marking the request as 'pending' on the queue 45 and completing, or returning a response by returning a completed packet back to the server queue 43 for transmission to the stub DLL 35 associated with that hardware device.

Each SPM 30 converts all WOSA transaction requests into one or more generic commands that are processed by a layer of small hardware DLLs 46. An Application Programming Interface (API) for each type of hardware device is published by the hardware vendor and consists of the minimum number of hardware level commands (example read_card on a magnetic stripe reader device, or dispense_cash on a dispenser) that can satisfy the complete set of WOSA transaction requests for that device type. For example, a respective hardware DLL is supplied for both an IBM Dispenser and an Olivetti dispenser. The user only has to change which DLL is active, by updating the Windows registry in order to switch between the different devices. At the application and server layers, nothing changes. The same is true for all device types.

Figure 4:
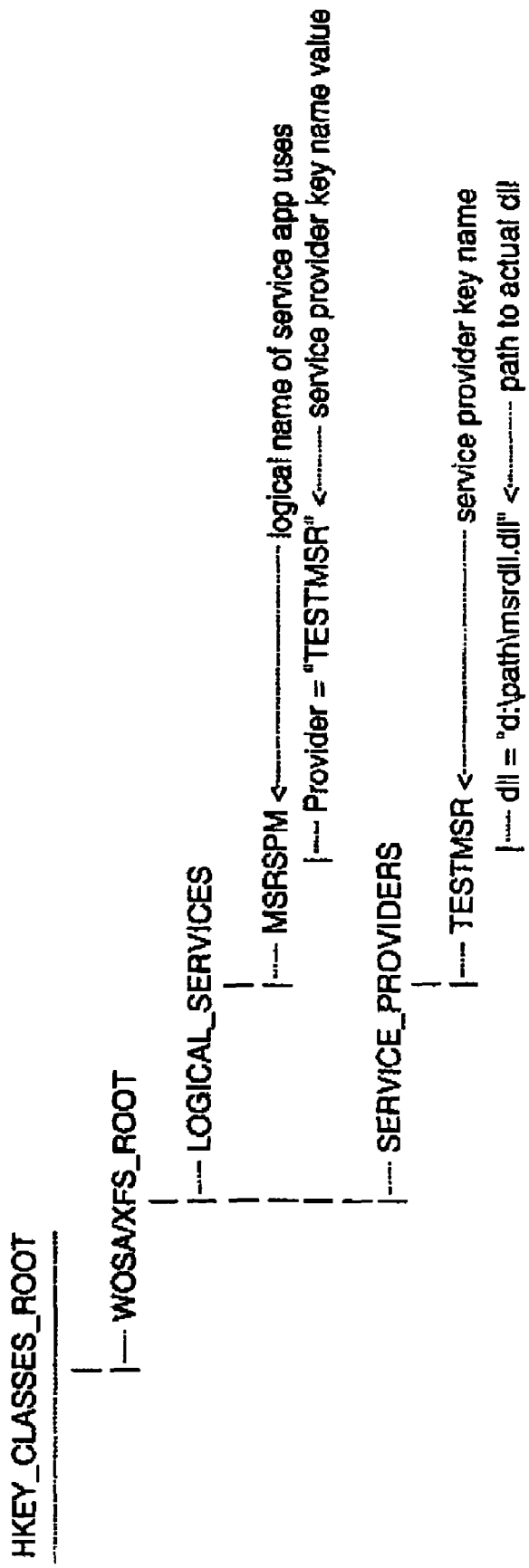
FIG. 4 is a schematic view of a portion of a Windows NT registry employed by a WOSA manager.
Figure 5:
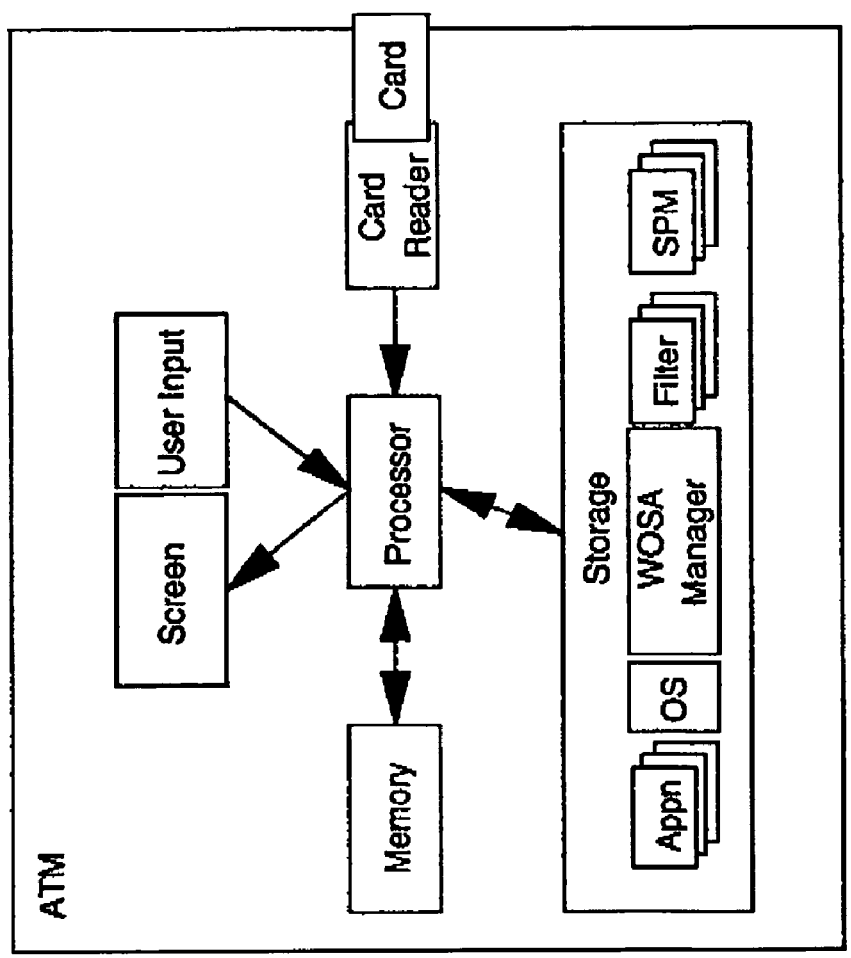
FIG. 5 is a schematic diagram of an ATM including a transaction processing system according to the invention.

The Windows NT registry is a hierarchy of keys, FIG. 4, each key containing one or more data values. The WOSA Manager 20 uses the system provided HKEY_CLASSES_ROOT key to store and obtain data on Logical Service Providers, for example, "msrspm". The application 10 opens a service by providing the WOSA manager with that service's logical name. The manager finds the key entry, "msrspm" in the HKEY_CLASSES_ROOT\WOSA\XFS_ROOT\LOGICAL_SERVICES key for that service. One of the data fields, "provider", within that key is an entry describing the service provider key name, "testmsr". The manager then accesses the relevant service provider key within the HKEY_CLASSES_ROOT\WOSA\XFS_ROOT\SERVICE_PROVIDERS key, which will contain an entry describing the exact path to the physical dynamic link library (dll) that contains the executable code for that service provider, "d:\path\msrdll.dll".

In the conventional WOSA transaction processing system of FIG. 1, the path to the physical file in the Windows registry will point to a service provider module 30. For service providers who support the alternative server model of FIG. 2, the path points to a stub DLL 35. This stub DLL 35 will thus direct any WOSA transaction requests across the process boundary to the server 40 as described above. If some vendor devices do not support the alternative server model, because they do not provide stub modules, then their respective SPMs can communicate directly with the WOSA manager 20 within the same process, as in the case of the SPM 37 in FIG. 2.

In the server models of FIGS. 1 and 2, the WOSA manager 20 can essentially regard any communication as being with a service provider layer. In the case of FIG. 1, communication with the service provider layer is more direct with the manager 20 communicating with the SPM's 30. In the case of FIG. 2, communication is less direct with the stub modules 35 representing the interface between the WOSA manager and the service provider layer.

In the present invention, one or more filter modules 36 are located in the communications channel between the WOSA manager and selected portions of the service provider layer, for example, the cash dispenser service provider module. This is accomplished during installation of the filter module, by updating the Windows registry with the location of the filter module 36 instead of the location of the appropriate SPM 37 in FIGS. 1 and 2 or stub module 38 in FIG. 2. During installation, the filter module is also updated with the location of the SPM or stub module it has replaced.

The filter module 36 of the present embodiment, monitors communications both from the manager 20 to the service provider layer and vice versa. In the case of the former, transaction requests are initially passed through to the filter module 36 from the WOSA manager, the filter module records these requests in a log 90 and then passes the requests on to the SPM or stub module.

Before passing the request on, however, the filter module alters the contents of the transaction request to change the window handle identifier to which the SPM must return its response, to that of the window handle of the filter module.

Thus, in the model of FIG. 1, the transaction request is first recorded by the filter module in the log 90, the window handle for the response is updated to that of the filter module and the original window handle destination for the response is saved, before passing the request to an SPM 37. The SPM passes the request to the ATM hardware and receives a response. Regardless of whether the original transaction request required a synchronous or asynchronous response, the response is passed from the SPM back to the filter module, which records the response in the log 90.

The filter module now passes the response back to the destination originally specified in the transaction request, that is, the WOSA manager 20 for synchronous requests or the application 10 for asynchronous requests.

In the case of FIG. 2, the steps of recording the transaction request and relaying the request to the service provider layer are the same as for FIG. 1, except that the requests are relayed to either a stub module 35 or a SPM 37 not compliant with the model of FIG. 2. For asynchronous responses, the messages passed from the SPMs 30 to the application 10, FIG. 3, are now directed to the filter module 36 corresponding to the SPM. The filter module 36 receives the responses, records them in the log 90 and relays the responses to the application 10. For synchronuous responses, the SPM's relay their responses through their associated queue 45 and then through to the stub modules 35 as normal. However, where a filter according to the present invention has been deployed, the stub modules 35 pass their response to the filter module 36 which records the response and relays the response to the WOSA manager 20.

It will be seen from the above embodiments, that neither the vendor SPM nor the application is aware that anything has happened and takes no part in the filter procedure.

It will also be seen that filter modules can be cascaded, so that one or more filters each dedicated to a particular task can be set between the WOSA manager and the service provider layer. An example of a type of filter module which could operate with the filter module according to the invention, is a security module for checking an application's right to access hardware described in Applicant's co-pending British Patent Application No. 9801931.8 (IBM Docket No. UK9-98-009).

The above description has extended only to traditional applications running on an ATM. However, a number of companies other than the Applicant, including Microsoft Corporation, Keybank incorporated of Cleveland, Ohio and Diebold Incorporated of Canton, Ohio have mooted the idea of using an automatic teller machine (ATM) to provide access to Internet services, for example, for executing financial transactions, ticket reservation and information retrieval. Thus, a web ATM (Automatic Teller Machine) includes appropriate Internet browser software, for example Internet Explorer from Microsoft as an application running with the transaction processing system according to the model of FIG. 1 or FIG. 2. The browser takes the place of the application 10 of FIGS. 1 and 2, and runs a Bank ATM Application written in the form of a page, or series of pages located on a bank web server (or cached on the local machine). The bank application, via its web pages, can prompt a web ATM user to swap web pages within the bank web site or to swap to web pages of any other web sites, for example, an airline web page or a supermarket web page.

The ATM Application pages are able to call methods for reading the users card and PIN number, for example, thus verifying the user's identity. The ATM Application can then prompt the ATM user to swap to other sites by, for example, displaying buttons on the ATM screen which can be touched by the user to select a site. By swapping to other sites, for example, an Airline booking system site, the user can for example select a flight and pay for the flight directly from the ATM using the user's bank account information. Other sites could be utility company sites, at which the user could pay a bill, or supermarket sites, at which a user could cash in loyalty points.

Thus, it will also be seen that the filter module and transaction processing system according to the invention can operate with more than one application 10 at any given time or, in the case of a web ATM, many web applications can run through the web browser along with conventional applications 10.

The invention claimed is:

1. A transaction processing system including:
    a transaction manager running in a first process and responsive to transaction requests from at least one application;
    a service provider layer including a set of service provider modules, each service provider module being adapted to relay transaction requests passed from said transaction manager to an associated hardware module and to relay transaction responses from said hardware module to said transaction manager or the at least one application; and
    at least one filter module adapted to intercept transaction requests from said transaction manager to said service provider layer and to process said requests, the at least one filter module being further adapted to intercept transaction responses from said service provider layer to said transaction manager and the at least one application and to process said responses;
    wherein the at least one filter module, said transaction manager and the at least one application has an associated identifier and wherein the at least one application is adapted to include the identifier of the application or the transaction manager to which transaction responses are to be relayed by the service provider layer in a transaction request, the at least one filter module being adapted to replace said identifier in at least some transaction requests with the identifier of the filter module so that responses to said requests from said service provider layer are relayed to said filter module.

2. A transaction processing system according to claim 1 in which the at least one filter module is adapted to process said requests and said responses by recording at least some of said requests and responses in a log.

3. A transaction processing system according to claim 1 including:
- a set of stub modules adapted to run in the same process as the transaction manager, each stub module being adapted to relay transaction request data passed from said transaction manager across a process boundary;
- a server adapted to run in a second process, said server being adapted to receive requests from said set of stub modules across the process boundary and to queue said requests for execution by said set of service provider modules;
- each service provider module corresponding to a stub module and being responsive to said queued requests to convert said queued requests to respective hardware specific calls for a device associated with each service provider module.

4. A transaction processing system as claimed in claim 3 wherein said transaction processing system is implemented on a Windows NT operating system, said operating system including a Windows registry, wherein said stub modules are implemented as stub dynamic link libraries which are adapted to be registered in the registry and wherein said transaction manager is adapted to call said stub DLLs by using information obtained by a lookup process performed on the Windows registry.

5. A transaction processing system as claimed in claim 4 in which the at least one filter module is adapted to intercept transaction requests to a stub module by replacing the stub module entry in the registry with an entry corresponding to the filter module, the at least one filter module being adapted to store the registration of the stub module so that once the filter has processed the request, the request is relayed to the stub module.

6. A transaction processing system as claimed in claim 4 wherein said transaction manager is a Windows Open System Architecture (WOSA) manager, said transaction requests are WOSA calls and said manager is adapted to relay said WOSA calls to said server via said stub modules, said server being adapted to convert said WOSA calls into constituent components, each component corresponding to a low level generic hardware function call.

7. A transaction processing system including:
- a transaction manager running in a first process and responsive to transaction requests from at least one application;
- a service provider layer including a set of service provider modules, each service provider module being adapted to relay transaction requests passed from said transaction manager to an associated hardware module and to relay transaction responses from said hardware module to said transaction manager or the at least one application;
- at least one filter module adapted to intercept transaction requests from said transaction manager to said service provider layer and to process said requests, the at least one filter module being further adapted to intercept transaction responses from said service provider layer to said transaction manager and the at least one application and to process said responses;

wherein one of said applications is a web browser adapted to run a web application, the web application including at least one web page.

8. A transaction processing system including:
- a transaction manager running in a first process and responsive to transaction requests from at least one application;
- a service provider layer including a set of service provider modules, each service provider module being adapted to relay transaction requests passed from said transaction manager to an associated hardware module and to relay transaction responses from said hardware module to said transaction manager or the at least one application;
- at least one filter module adapted to intercept transaction requests from said transaction manager to said service provider layer and to process said requests, the at least one filter module being further adapted to intercept transaction responses from said service provider layer to said transaction manager and the at least one application and to process said responses;
- wherein said transaction processing system cooperates with a registry, wherein said service provider modules are adapted to be registered in the registry and wherein said transaction manager is adapted to call said service provider modules by using information obtained by a lookup process performed on the registry.

9. A transaction processing system as claimed in claim 8 in which the at least one filter module is adapted to intercept transaction requests to a service provider module by replacing the service provider module entry in the registry with an entry corresponding to the filter module, the at least one filter module being adapted to store the registration of the service provider module so that once the filter has processed the request, the request is relayed to the service provider module.

10. An Automatic Teller Machine including
a. a processor connected to
b. a memory,
c. a screen display,
d. a user input means,
e. a card reader, and
f. a storage medium, said storage medium being adapted to store operating system software and a transaction processing system including:
- a transaction manager running in a first process and responsive to transaction requests from at least one application;
- a service provider layer including a set of service provider modules, each service provider module being adapted to relay transaction requests passed from said transaction manager to an associated hardware module and to relay transaction responses from said hardware module to said transaction manager or the at least one application; and
- at least one filter module adapted to intercept transaction requests from said transaction manager to said service provider layer and to process said requests, the at least one filter module being further adapted to intercept transaction responses from said service provider layer to said transaction manager and the at least one application and to process said responses.

11. An ATM as claimed in claim 10 wherein one of said applications is operable to request user input from said user input means and to request data to be read from a card inserted in said card reader and one of the at least one filter modules is adapted to process said requests.

* * * * *